(12) United States Patent
Prieto et al.

(10) Patent No.: US 12,292,123 B2
(45) Date of Patent: May 6, 2025

(54) CLAPPER WITH AN UPSTREAM CAM-ARM AND ROLLER ARRANGEMENT

(71) Applicant: Acorn Engineering Company, Inc., City of Industry, CA (US)

(72) Inventors: Luis Fernando Prieto, Chino, CA (US); Alan Long Thien Du, Covina, CA (US); Pui Yuen Ng, Eastvale, CA (US); Arturo Gomez, Moreno Valley, CA (US); Adrian Alexander Filip, Corona, CA (US)

(73) Assignee: Acorn Engineering Company, Inc., City of Industry, CA (US)

( * ) Notice: Subject to any disclaimer, the term of this patent is extended or adjusted under 35 U.S.C. 154(b) by 51 days.

(21) Appl. No.: 18/369,722

(22) Filed: Sep. 18, 2023

(65) Prior Publication Data

US 2024/0093795 A1 Mar. 21, 2024

Related U.S. Application Data

(60) Provisional application No. 63/407,490, filed on Sep. 16, 2022.

(51) Int. Cl.
F16K 15/03 (2006.01)

(52) U.S. Cl.
CPC ................. *F16K 15/033* (2013.01)

(58) Field of Classification Search
CPC ............... F16K 15/03; F16K 15/033
See application file for complete search history.

(56) References Cited

U.S. PATENT DOCUMENTS

| 3,789,874 A * | 2/1974 | Hills ...................... F16K 1/24 |
| | | 251/303 |
| 2016/0084393 A1* | 3/2016 | Barone ................ F16K 15/038 |
| | | 137/527 |

* cited by examiner

*Primary Examiner* — P. Macade Nichols
(74) *Attorney, Agent, or Firm* — The Webb Law Firm (57) ABSTRACT

A check valve may include: a check seat defining a flow path; a clapper assembly hingedly connected to the check seat and configured to obstruct the flow path, including: a clapper and a seal retainer detachably mounted to the clapper; a first extension extending from the clapper assembly in an upstream direction and having a roller; a cam arm rotatable relative to the clapper assembly and configured to engage with the roller; and a torsion spring operatively connected to the cam arm so as to apply a biasing force to the cam arm in the upstream direction. The biasing force may be imparted to the clapper assembly via the cam arm and roller, so that the clapper assembly obstructs the flow path.

20 Claims, 5 Drawing Sheets

CLAPPER WITH AN UPSTREAM CAM-ARM AND ROLLER ARRANGEMENT

CROSS REFERENCE TO RELATED APPLICATIONS

This application claims priority to U.S. Provisional Patent Application Ser. No. 63/407,490, titled "Clapper with an Upstream Cam-Arm and Roller Arrangement" and filed on Sep. 16, 2022, the disclosure of which is incorporated herein in its entirety.

BACKGROUND OF THE INVENTION

Field of the Invention

The present disclosure relates to a clapper check valve having an upstream cam-arm and roller arrangement.

Description of Related Art

Check valves create a stop for fluid flow within a greater fluid flow system. They are biased to stop the flow of fluid in one direction, and the biasing forces only give way to fluid flow once the cracking pressure is reached. The cracking pressure is the minimum differential upstream pressure between the inlet and the outlet of the check valve. In other words, the cracking pressure is reached when the forces of the fluid flow overcome the biasing forces of the check valve.

Due to the high pressures created within fluid flow systems, the biasing forces of check valves must be equally strong. This creates a problem within the check valve as they lack the ability to have dynamic opening properties and they make maintenance difficult to perform. When elements of the check valves are downstream of the fluid flow, the fluid flow can be impeded in such a way that the valve does not remain open when upstream pressure indicates otherwise. Thus, there is a need for a check valve with the features associated with that check valve being generally located upstream.

SUMMARY OF THE INVENTION

In one embodiment or aspect of the present disclosure, a check valve may include: a check seat defining a flow path; a clapper assembly hingedly connected to the check seat and configured to obstruct the flow path, the clapper assembly may include: a clapper; and a seal retainer detachably mounted to the clapper; a first extension extending from the clapper assembly in an upstream direction, the first extension comprising a roller a cam arm rotatable relative to the clapper assembly, the cam arm configured to engage with the roller; and a torsion spring operatively connected to the cam arm so as to apply a biasing force to the cam arm in the upstream direction. The biasing force may be imparted to the clapper assembly via the cam arm and roller, so that the clapper assembly may be urged in a direction to obstruct the flow path.

The clapper may be hingedly connected to the check seat downstream of the seal retainer. The check valve assembly may further include a second extension extending from the check seat in the upstream direction, and the cam arm may be rotatably connected to the second extension. The torsion spring may extend about at least a portion of the second extension. The second extension may include a shaft defining a first axis, and the cam arm may be rotatably connected to the shaft about the first axis. The second extension may include: a first leg extending from the check seat in the upstream direction; and a second leg extending from the check seat in the upstream direction. The shaft may extend between the first leg and the second leg.

The torsion spring may define a path configured to receive at least a portion of the roller therein. The first extension may include: a first leg extending from the clapper assembly in the upstream direction; and a second leg extending from the clapper assembly in the upstream direction. The roller may extend between the first leg and the second leg. The first extension may extend from the seal retainer. The seal retainer may define a slot configured to receive at least a portion of the cam arm therein. The clapper assembly may further include a seal extending about at least a portion of the seal retainer, and the seal may sit on the clapper. The clapper assembly may further include screws configured to mount the seal retainer to the clapper. Upon fluid flowing within the flow path reaching a cracking pressure, the clapper assembly may be configured to open, and the roller may be configured to roll along the cam arm.

According to another embodiment or aspect of the present disclosure, a check valve may include: a valve body defining a flow path and a longitudinal axis; a check seat extending from the valve body, the check seat defining an interior; a clapper assembly hingedly connected to the check seat downstream of the interior and configured to obstruct the flow path, the clapper assembly may include: a clapper; and a seal retainer detachably mounted to the clapper; a first extension extending from the clapper assembly in an upstream direction, the first direction having a roller; a second extension extending from the check seat in the upstream direction; a cam arm rotatably connected to the second extension and configured to contact the roller; and a torsion spring operatively connected to the cam arm so as to apply a biasing force to the cam arm, the biasing force acting in the upstream direction. The biasing force may be imparted to the clapper assembly via the cam arm and roller, so that the clapper assembly is urged to obstruct the flow path.

The cam arm may define a path configured to receive at least a portion of the roller therein. The second extension may include a shaft extending in a direction perpendicular to the longitudinal axis, and the cam arm may be rotatable about the shaft. The torsion spring may extend about at least a portion of the shaft. The roller and the shaft may be disposed on the same side of the longitudinal axis. The first extension may extend from the seal retainer.

In some embodiments or aspects, the present disclosure can be characterized by the following clauses.

Clause 1. A check valve comprising: a check seat defining a flow path; a clapper assembly hingedly connected to the check seat and configured to obstruct the flow path, the clapper assembly comprising: a clapper; and a seal retainer detachably mounted to the clapper; a first extension extending from the clapper assembly in an upstream direction, the first extension comprising a roller; a cam arm rotatable relative to the clapper assembly, the cam arm configured to engage with the roller; and a torsion spring operatively connected to the cam arm so as to apply a biasing force to the cam arm in the upstream direction, wherein the biasing force is imparted to the clapper assembly via the cam arm and roller, so that the clapper assembly is urged in a direction to obstruct the flow path.

Clause 2. The check valve of clause 1, wherein the clapper is hingedly connected to the check seat downstream of the seal retainer.

Clause 3. The check valve of clause 1 or 2, further comprising a second extension extending from the check seat in the upstream direction, wherein the cam arm is rotatably connected to the second extension.

Clause 4. The check valve of clause 3, wherein the torsion spring extends about at least a portion of the second extension.

Clause 5. The check valve of clause 3, wherein the second extension comprises a shaft defining a first axis, and wherein the cam arm is rotatably connected to the shaft about the first axis.

Clause 6. The check valve of clause 5, wherein the second extension comprises: a first leg extending from the check seat in the upstream direction; and a second leg extending from the check seat in the upstream direction, wherein the shaft extends between the first leg and the second leg.

Clause 7. The check valve of clause 6, wherein the torsion spring extends about at least a portion of the shaft.

Clause 8. The check valve of any of clauses 1-7, wherein the cam arm defines a path configured to receive at least a portion of the roller therein.

Clause 9. The check valve of clause 8, wherein the first extension comprises: a first leg extending from the clapper assembly in the upstream direction; and a second leg extending from the clapper assembly in the upstream direction, wherein the roller extends between the first leg and the second leg.

Clause 10. The check valve of any of clauses 1-9, wherein the first extension extends from the seal retainer.

Clause 11. The check valve of clause 10, wherein the seal retainer defines a slot configured to receive at least a portion of the cam arm therein.

Clause 12. The check valve of any of clauses 1-11, wherein the clapper assembly further comprises a seal extending about at least a portion of the seal retainer, and wherein the seal sits on the clapper.

Clause 13. The check valve of any of clauses 1-12, wherein the clapper assembly further comprises screws configured to mount the seal retainer to the clapper.

Clause 14. The check valve of any of clauses 1-13, wherein upon fluid flowing within the flow path reaching a cracking pressure, the clapper assembly is configured to open, and the roller is configured to move along the cam arm.

Clause 15. A check valve comprising: a valve body defining a flow path and a longitudinal axis; a check seat extending from the valve body, the check seat defining an interior; a clapper assembly hingedly connected to the check seat downstream of the interior and configured to obstruct the flow path, the clapper assembly comprising: a clapper; and a seal retainer detachably mounted to the clapper; a first extension extending from the clapper assembly in an upstream direction, the first direction comprising a roller; a second extension extending from the check seat in the upstream direction; a cam arm rotatably connected to the second extension and configured to contact the roller; and a torsion spring operatively connected to the cam arm so as to apply a biasing force to the cam arm, the biasing force acting in the upstream direction, wherein the biasing force is imparted to the clapper assembly via the cam arm and roller, so that the clapper assembly is urged to obstruct the flow path.

Clause 16. The check valve of clause 15, wherein the cam arm defines a path configured to receive at least a portion of the roller therein.

Clause 17. The check valve of clause 15 or 16, wherein the second extension comprises a shaft extending in a direction perpendicular to the longitudinal axis, and wherein the cam arm is rotatable about the shaft.

Clause 18. The check valve of clause 17, wherein the torsion spring extends about at least a portion of the shaft.

Clause 19. The check valve of clause 17 or 18, wherein the roller and the shaft are disposed on the same side of the longitudinal axis.

Clause 20. The check valve of any of clauses 15-19, wherein the first extension extends from the seal retainer.

DESCRIPTION OF THE INVENTION

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

The terms "first", "second", and the like are not intended to refer to any particular order or chronology, but refer to different conditions, properties, or elements.

The term "includes" is synonymous with "comprises".

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The present disclosure is directed to a check valve assembly 10 for use in a piping system 2. The check valve assembly 10 is disposed within a valve body 4 that surrounds the check valve assembly 10 and extends about a longitudinal axis L. Fluid flows in the directions shown with the arrow F. The check valve assembly 10 defines an upstream area U and a downstream area D within the piping system 2. The upstream area U is located upstream of the check valve assembly 10, and the downstream area D is located downstream of the check valve assembly 10. When viewing in FIGS. 1-5, the upstream area U is generally to the left of the page, and the downstream area D is generally to the right. Upstream and downstream also define directions, meaning that if some element extends or moves in the upstream direction, that element is extending or moving in the direction of the upstream area U. If some element extends or moves in the downstream direction, then that element extends or moves in the direction of the downstream area D. Fluid flows in the downstream direction from the upstream area U to the downstream area D.

With reference to FIGS. 1-5, the check valve assembly 10 is shown as a clapper valve. While being shown within simple valve body 4, one having ordinary skill in the art will understand how the check valve assembly 10 can be displaced in more complex valve bodies and piping systems 2. One having skill in the art will also understand how the elements described in this disclosure can be used in connection with other types of check valves, such as a poppet valve. The check valve assembly 10 includes a check seat 12 and a clapper assembly 20. The check seat 12 is rounded, and in some embodiments, substantially circular. The check seat 12 also extends about the longitudinal axis L. The check seat 12 extends from the valve body 4 and further defines the fluid flow path F within the valve body 4. The check seat 12 defines an interior space 14 and includes an upstream side 16 and a downstream side 18, with the interior space 14 extending between those sides 16, 18. The interior space 14 is open, so that fluid may flow through the interior space 14 and through the check valve assembly 10. Therefore, the interior space 14 further defines the fluid flow path F within the check seat 12.

Connected to the check seat 12 is a clapper assembly 20. The clapper assembly 20 is arranged to obstruct the interior space 14 and to block fluid from flowing through the check valve assembly 10. The clapper assembly 20 forms a fluid tight seal with the downstream side 18 of the check seat 12. The clapper assembly 20 includes a clapper 22 and a seal retainer 24 mounted to the clapper 22. The clapper 22 includes a clapper body 26, and the seal retainer 24 includes a seal retainer body 28. The seal retainer 24 is mounted to the clapper 22, so that when the check valve assembly 10 is in use within a valve or piping system, both the seal retainer body 28 and the clapper body 26 obstruct the fluid flow path F within the interior space 14. As shown, the seal retainer 24 is disposed upstream of the clapper 22, and the clapper 22 is disposed downstream of the seal retainer 24. Fasteners 30 connect the seal retainer 24 and clapper 22. As shown, the fasteners 30 are screws, but other fasteners known to those in the art may be used. As will be described later, the fasteners 30 may be arranged about the seal retainer body 28 and the clapper body 26 in a specific manner. Although not shown, both the bodies 26, 28 have corresponding apertures to receive the fasteners 30. To facilitate the connection between the clapper 22 and the seal retainer 24, a rubber seal 32 is arranged within the clapper body 26 on an upstream side of the clapper body 26. The rubber seal 32 extends circumferentially about the clapper body 26, and contacts at least a portion of the seal retainer 14 and downstream side 18. The clapper body 26 defines a corresponding space 27 extending about a downstream side of the clapper body 26 to receive the rubber seal 32. The rubber seal 32 helps to prevent leakage through the seal retainer 24 and clapper 22. As will be described below, the fasteners 30 can be removed from the clapper body 26 and the seal retainer body 28 to dismount the seal retainer 24 from the clapper 22. This allows maintenance to be performed on clapper 22, seal retainer 24, and rubber seal 32 downstream of the check seat 12.

The clapper 22 is connected to the check seat 12 on a downstream side by a hinge 34. The hinge 34 includes a clapper hinge portion 36 that engages with a check seat hinge portion 38. In particular, the clapper hinge portion 36 includes two sides 36A, 36B extending from a top portion of the clapper 22 that receive the check seat hinge portion 38 therebetween. A pin 37 or other connecting mechanism can be received through the respective hinge portions 36, 38 to form the hinge 34. The hinge 34 allows for the clapper assembly 20 to pivot and rotate relative to the hinge 34 when the fluid flow reaches the cracking pressure. When fluid flow reaches the cracking pressure, the pressure from the fluid flow opens the clapper assembly 20, forcing the clapper assembly 20 to rotate about the hinge 34. Since the seal retainer 24 is the most upstream portion of the clapper assembly 20, the fluid presses against the seal retainer 24 to open the clapper assembly 20.

Extending from the seal retainer 24 in the upstream direction is a first extension 40. The first extension includes a roller 42 arranged between a first leg 44 and a second leg 46. The roller 42 may also be a cylindrical shaft extending between the legs 44, 46. The roller 42 and legs 44, 46 are aligned to define an axis A1. As shown, the axis A1 extends perpendicular to the direction of fluid flow F, but other arrangements the axis A1 may be used.

A cam arm 48 is arranged relative to the first extension 40, so that the cam arm 48 can transfer a biasing force to the first extension 40, thereby biasing the seal retainer 24 to a closed position where the fluid flow is obstructed by the clapper assembly 20. The cam arm 48 includes a body 50 with a first end 52 and a second end 54. Parts of the body 50 are rounded or curved, as shown in the figures. In particular, one part of the body 50 between the first end 52 and the second end 54 defines a notch 56. The notch 56 is shaped so that it receives at least a portion of the roller 42 therein. The notch 56 is essentially a path along the body, and it also defines a bearing surface 58 that contacts the roller 42 during operation of the valve assembly 10, which will be discussed in greater detail below. The bearing surface 58 is curved or otherwise shaped to repeatedly contact the roller 42 during use. While the cam arm 48 has different curves defining its shape, if a straight line is formed between the first end 52 and the second end 54, the straight line is generally perpendicular to the direction of fluid flow F.

The biasing force is provided by a torsion spring 60. The torsion spring 60 is operatively connected to the cam arm 48 at or near the first end 52. Proximate the first end 52, the cam arm 48 includes a stopper 62 that defines a receiving slot 64 with the first end. The torsion spring 60 extends along the cam arm 48 in the receiving slot 64. The torsion spring 60 urges the cam arm 48 to rotate in the clockwise direction. The clockwise direction can be relative to the axis A1 or to a direction perpendicular to the direction of fluid flow F. A direction perpendicular to the direction of fluid flow F extends out of the page in the figures. This urging forces the bearing surface 58 to contact the roller 42, with at least part of the roller 42 being received within the notch 56. By urging the roller 42 in the clockwise direction, the cam arm 48 urges the seal retainer 24 and clapper assembly 20 into the closed position via the first extension 40. To open the clapper assembly 20, fluid flow must overcome the force applied by the torsion spring 60. The cracking pressure may be equal to or be a function of the force applied by the torsion spring 60.

The cam arm 48 is supported by a second extension 68. The second extension extends from the upstream side 16 of the check seat 12. The second extension 68 includes a first leg 70 and a second leg 72, with a shaft 74 extending therebetween. The shaft 74 defines an axis A2. Axis A2 extends substantially parallel to axis A1 and perpendicular to the direction of fluid flow F. Other arrangements of axis A2 may be used. Axis A2 is located closer to a top portion of the check seat 12 than axis A1. Axis A2 may be located at the same or at a similar height as the hinge 34 with respect to the check seat 12. Both axes A1, A2 may be arranged above the longitudinal axis L.

The first end 52 of the cam arm 48 is mounted to the shaft 74 and is configured to rotate around the shaft 74 and the axis A2. The first end defines an aperture to mount the cam arm 48 to the shaft 74. The torsion spring 60 also extends about the shaft 74, with a first part wound about the shaft 74 on one side of the cam arm 48 and a second part wound about the shaft 74 on an opposing side of the cam arm 48. With the portion of the torsion spring 60 extending through the receiving slot 64, the entirety of the torsion spring 60 applies a force to the cam arm 48 to urge the cam arm 48 to rotate in the clockwise direction. While the torsion spring 60 is shown extending about the majority of the shaft 74, it is contemplated that the torsion spring 60 may extend about only some of the shaft 74, with some or all of that extension occurring on one or more sides of the cam arm 48.

Figure 1:
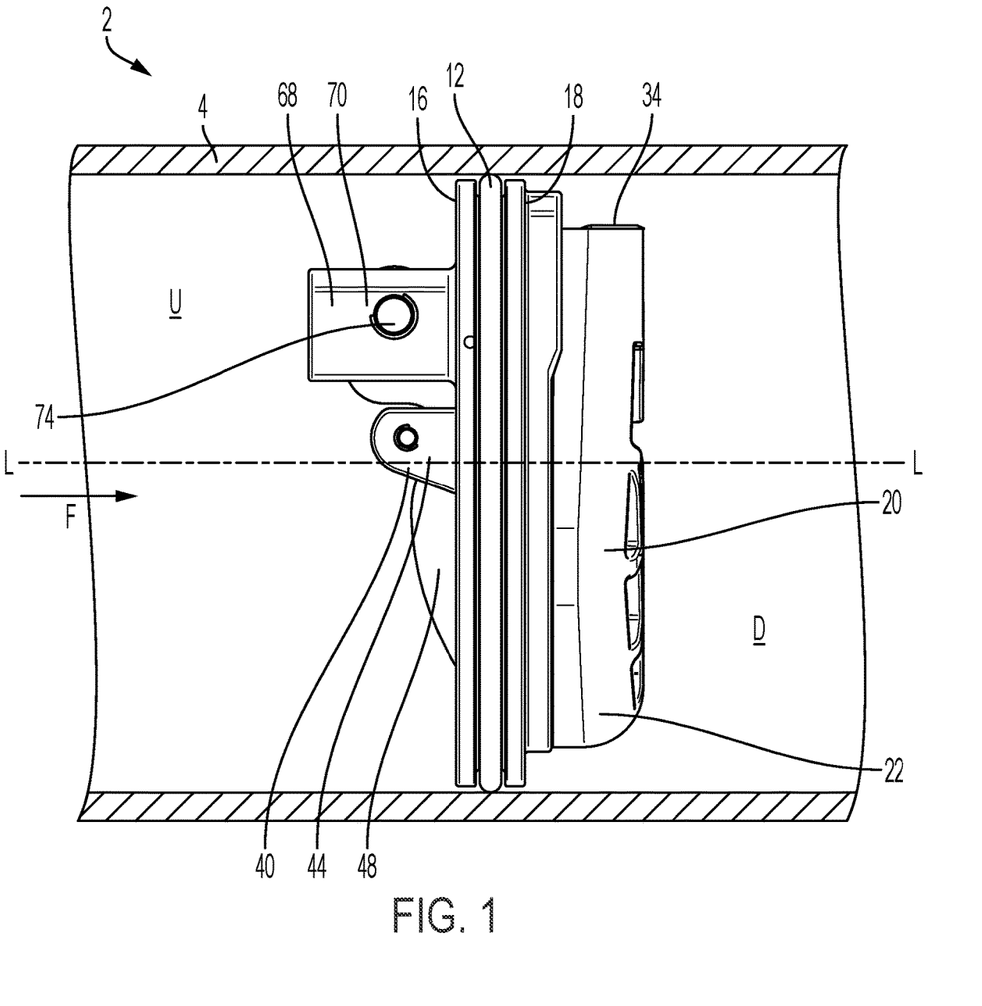
FIG. 1 is a partially cross-sectional side view showing a check valve in a pipe system according to one aspect or embodiment of the present disclosure.
Figure 2:
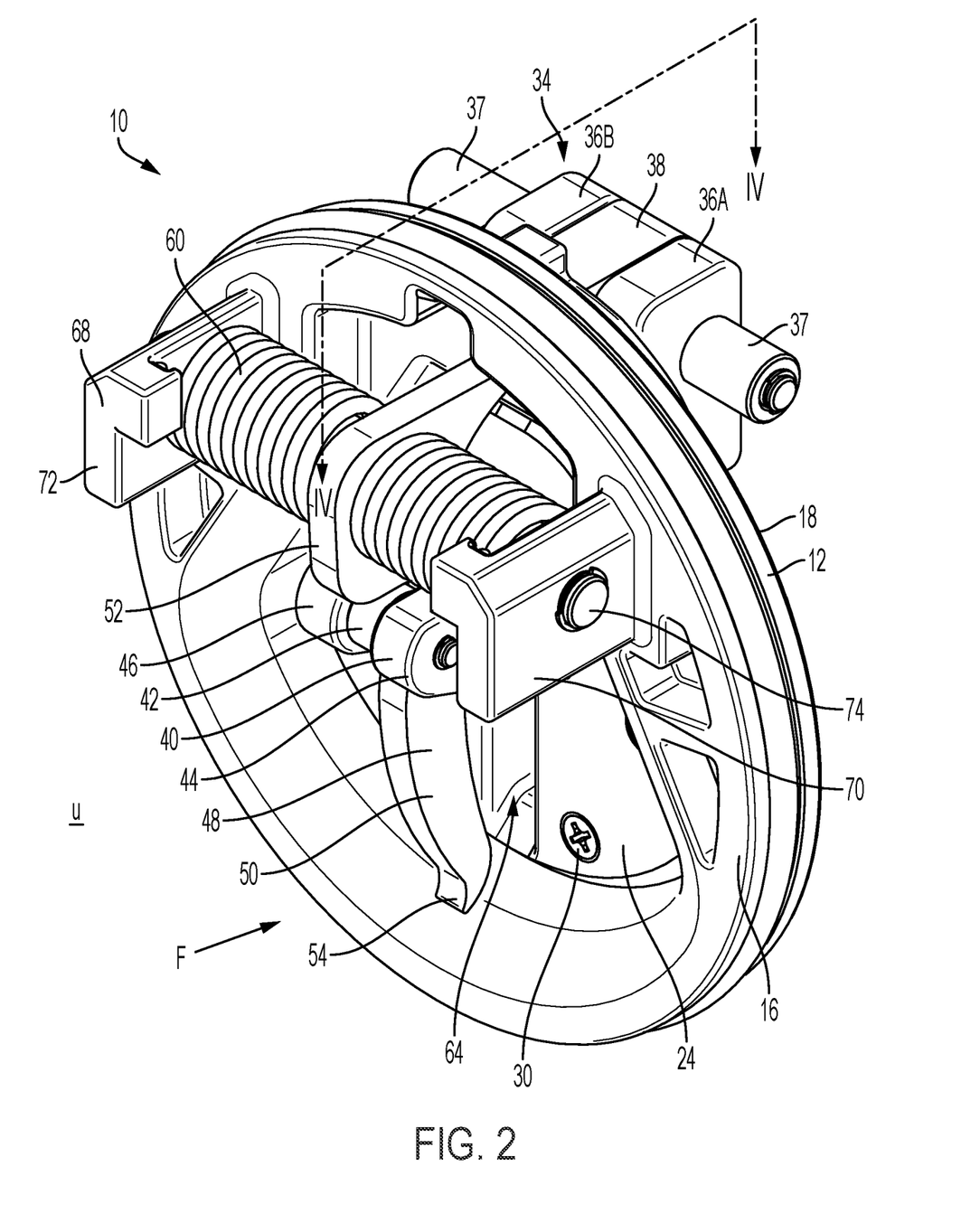
FIG. 2 is a perspective view of an upstream side of a check valve in the closed position according to one embodiment or aspect of the present disclosure.
Figure 3:
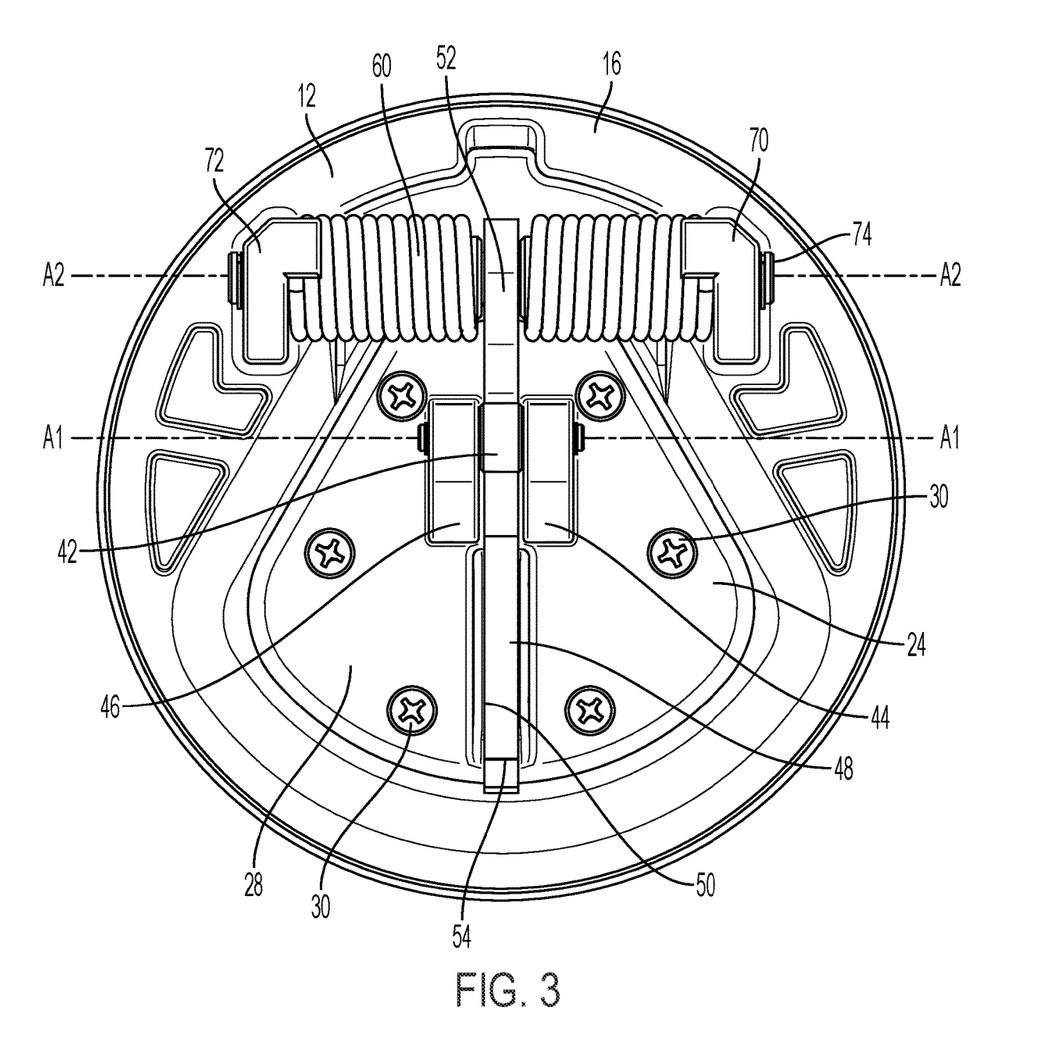
FIG. 3 is a side view of the upstream side of the check valve of FIG. 1.
Figure 4:
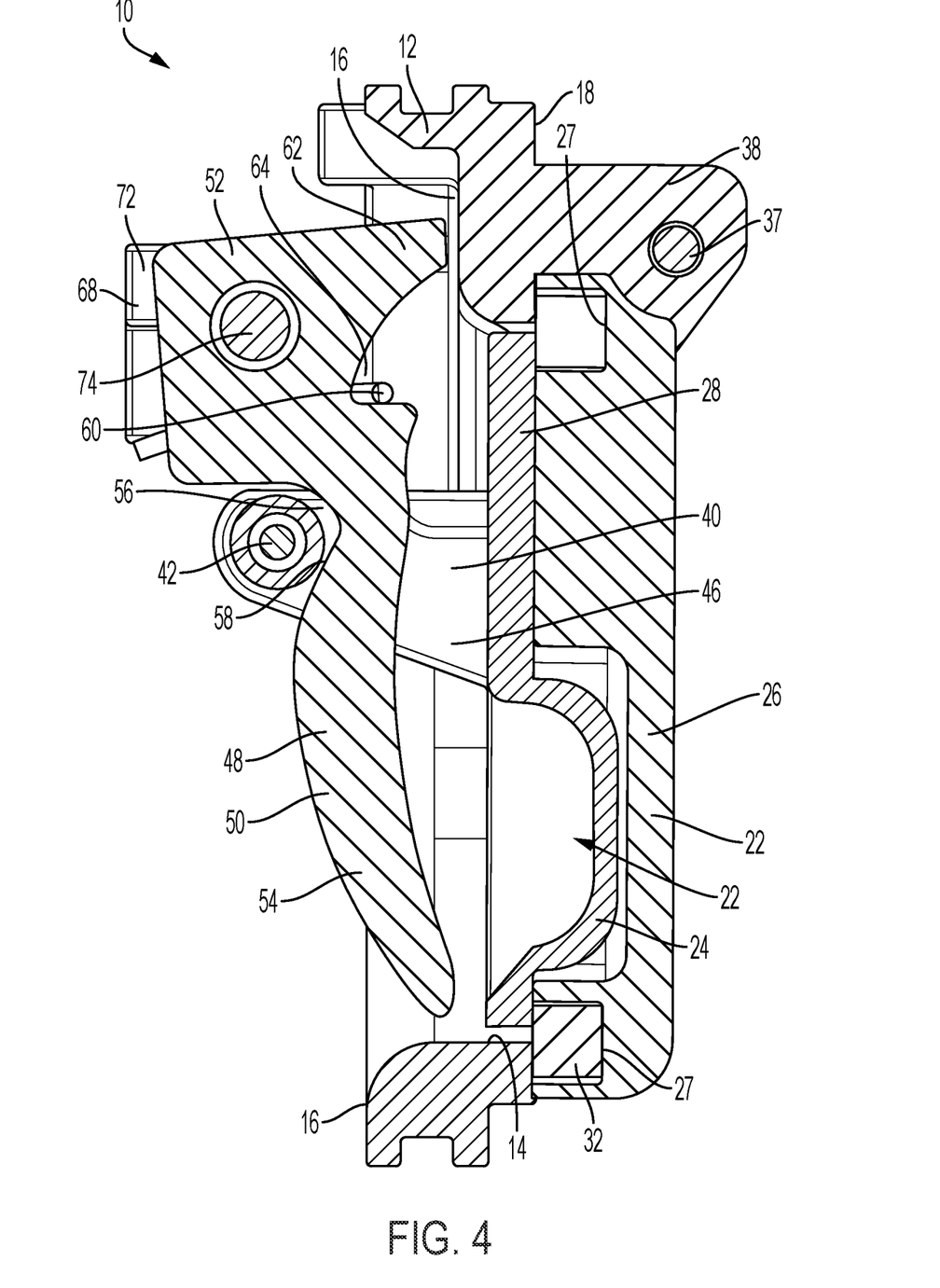
FIG. 4 is a cross-sectional side view of the check valve of FIG. 1 in an closed position taken at line IV-IV.
Figure 5:
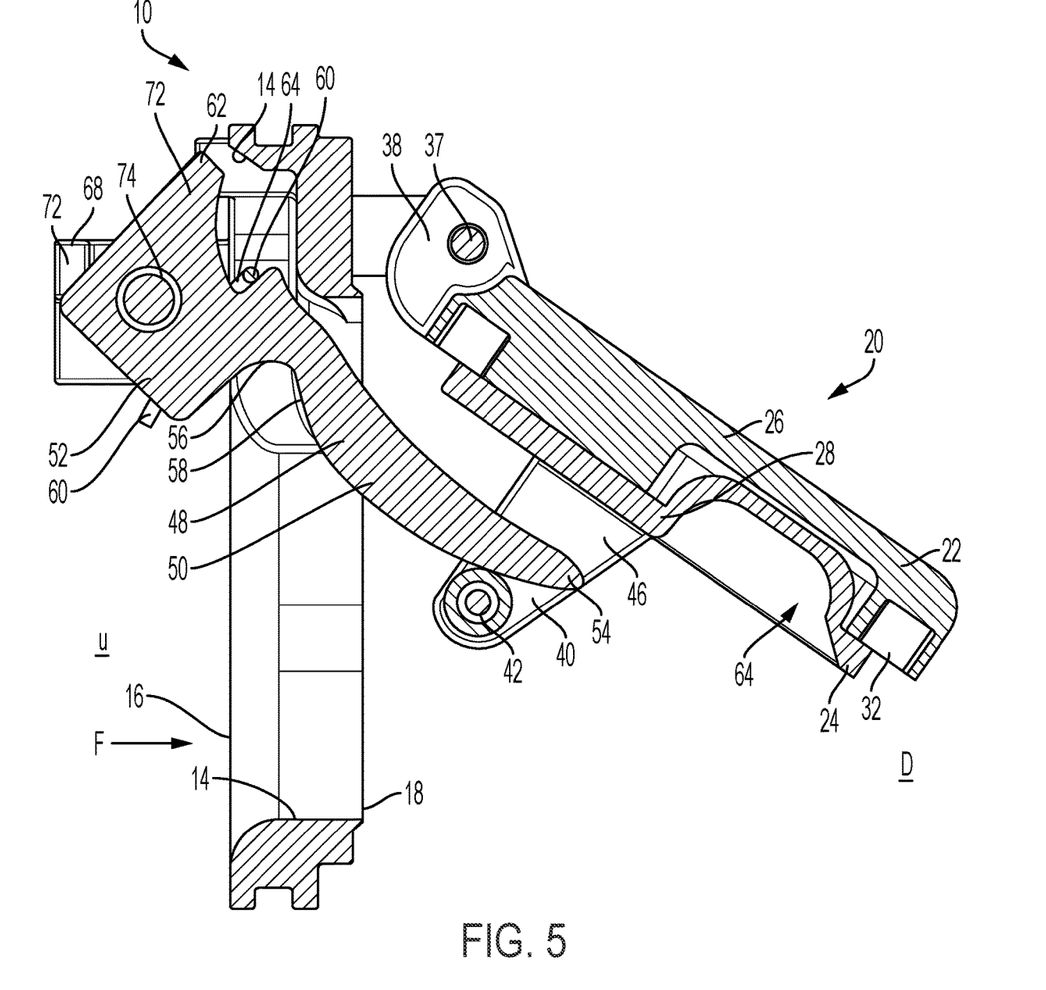
FIG. 5 is a cross-sectional side view of the check valve of FIG. 1 in an open position taken at line IV-IV.

While already briefly described, the operation of the check valve assembly 10 will now be discussed in connection with FIGS. 4 and 5. FIG. 4 shows the check valve assembly 10 in a closed position, with the clapper assembly 20 obstructing the flow path F in the check seat 12. As noted above, the torsion spring 60 imparts a force to the cam arm 48 to urge the cam arm 48 to rotate about the shaft 74 in the clockwise direction. This urging forces the notch 56 to engage with the roller 42, with the roller 42 contacting the bearing surface 58. This contact urges the roller 42 to rotate in the clockwise direction with the cam arm 48. Because the roller 42 is connected to the seal retainer 24 via the first leg 44 and the second leg 46, the seal retainer 24 is also urged to rotate in the clockwise direction. This urging places the seal retainer 24 and clapper 22 in the closed position, obstructing fluid flow F and preventing fluid from moving through the interior space 14 of the check valve assembly 10. The contact made between the clapper 22 and the downstream side 18 stops the clapper assembly 10 from moving farther upstream.

To remove the obstruction caused by the clapper assembly 20 in the flow path F, the force of the fluid flowing against the seal retainer 24 must overcome the force of the torsion spring 60 holding the clapper assembly 20 in the closed position. When this occurs, the clapper assembly 20 pivots and/or rotates about the hinge 34 into an open position in a counter clockwise direction. The open position is exemplified in FIG. 5. The opening of the clapper assembly 20 forces the roller 42 to rotate relative to the cam arm 48. The arrangement of the notch 56 and bearing surface 58 and the shape of the cam arm body 50 means that the rotation of the clapper assembly 20 moves the roller 42 out of the notch and along the cam arm body 50 in the direction of the second end 54. With these shapes and engagements, the notch 56 can be considered a path on which the roller 42 travels during use of the valve assembly 10. As it moves, the roller 42 applies a force to the cam arm body 50, which rotates the cam arm 48 in the counter clockwise direction against the force of the torsion spring 60. The force of the torsion spring 60 is still acting against the opening of the clapper assembly 20, so whenever the force of the fluid flow decreases to a certain amount, the force of the torsion spring 60 will force the clapper assembly 20 to reverse its rotation until the clapper assembly 20 is again in the closed position.

When the clapper assembly 20 is in the closed position, it may be desirable to perform maintenance on some features of the check valve assembly 10. In particular, it may be advantageous to access the clapper 22, seal retainer 24, and/or the rubber seal 32 to perform downstream maintenance on those features when the check valve assembly 10 is isolated within a piping system. To do this, the fasteners 30 are removed from the clapper body 26 and the seal retainer body 28. This dismounts the seal retainer 24 from the clapper 22. This means that the clapper 22 is no longer urged in the upstream direction by the force applied to the seal retainer through the roller 42, cam arm 48, and torsion spring 60. Thus, the clapper 22 can be rotated freely about the hinge 34. This allows for downstream maintenance to be performed on the entirety of the clapper 22, rubber seal 32, and hinge 34 and the part of the seal retainer 24 that is exposed downstream. The accessible parts of the check seat 12 may also be inspected or have maintenance performed thereon.

Referring back to FIGS. 1-5, additional features of the check valve assembly 10 will now be described. To facilitate rotation of the cam arm 48 relative to the seal retainer 14, the seal retainer body 28 may define a receiving slot 64 configured to receive the second end 54 and other portions of the cam arm 48 during its counter clockwise rotation. As shown, the cam arm 48 is arranged in essentially the center of the check valve assembly 10. When viewing the check valve assembly 10 in the downstream direction as in FIG. 2, the cam arm 48 extends perpendicular to the direction of fluid flow at or near a center line of the check valve assembly 10. The fasteners 30 may be arranged in the clapper assembly 20 symmetrically about the cam arm 48. The stopper 62 of the cam arm 48 may extend from the first end 52 so as to contact the upstream side 16 of the check seat 12 during maintenance of the check valve assembly 10. This arrangement helps to prevent injuries to the person performing the maintenance due to over rotation of the cam arm 48 caused by the torsion spring.

While specific embodiments of the devices of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. A check valve comprising:
   a check seat defining a flow path;
   a clapper assembly hingedly connected to the check seat and configured to obstruct the flow path, the clapper assembly comprising:
      a clapper; and
      a seal retainer detachably mounted to the clapper;
   a first extension extending from the clapper assembly in an upstream direction, the first extension comprising a roller;
   a cam arm rotatable relative to the clapper assembly, the cam arm configured to engage with the roller; and
   a torsion spring operatively connected to the cam arm so as to apply a biasing force to the cam arm in the upstream direction,
   wherein the biasing force is imparted to the clapper assembly via the cam arm and roller, so that the clapper assembly is urged in a direction to obstruct the flow path.

2. The check valve assembly of claim 1, wherein the clapper is hingedly connected to the check seat downstream of the seal retainer.

3. The check valve assembly of claim 1, further comprising a second extension extending from the check seat in the upstream direction,
wherein the cam arm is rotatably connected to the second extension.

4. The check valve assembly of claim 3, wherein the torsion spring extends about at least a portion of the second extension.

5. The check valve assembly of claim 3, wherein the second extension comprises a shaft defining a first axis, and
wherein the cam arm is rotatably connected to the shaft about the first axis.

6. The check valve assembly of claim 5, wherein the second extension comprises:
a first leg extending from the check seat in the upstream direction; and
a second leg extending from the check seat in the upstream direction,
wherein the shaft extends between the first leg and the second leg.

7. The check valve assembly of claim 6, wherein the torsion spring extends about at least a portion of the shaft.

8. The check valve assembly of claim 1, wherein the cam arm defines a path configured to receive at least a portion of the roller therein.

9. The check valve assembly of claim 8, wherein the first extension comprises:
a first leg extending from the clapper assembly in the upstream direction; and
a second leg extending from the clapper assembly in the upstream direction,
wherein the roller extends between the first leg and the second leg.

10. The check valve assembly of claim 1, wherein the first extension extends from the seal retainer.

11. The check valve assembly of claim 10, wherein the seal retainer defines a slot configured to receive at least a portion of the cam arm therein.

12. The check valve assembly of claim 1, wherein the clapper assembly further comprises a seal extending about at least a portion of the seal retainer, and
wherein the seal sits in the clapper.

13. The check valve assembly of claim 1, wherein the clapper assembly further comprises screws configured to mount the seal retainer to the clapper.

14. The check valve assembly of claim 1, wherein upon fluid flowing within the flow path reaching a cracking pressure, the clapper assembly is configured to open, and the roller is configured to move along the cam arm.

15. A check valve comprising:
a valve body defining a flow path and a longitudinal axis;
a check seat extending from the valve body, the check seat defining an interior;
a clapper assembly hingedly connected to the check seat downstream of the interior and configured to obstruct the flow path, the clapper assembly comprising:
a clapper; and
a seal retainer detachably mounted to the clapper;
a first extension extending from the clapper assembly in an upstream direction, the first direction comprising a roller;
a second extension extending from the check seat in the upstream direction;
a cam arm rotatably connected to the second extension and configured to contact the roller; and
a torsion spring operatively connected to the cam arm so as to apply a biasing force to the cam arm, the biasing force acting in the upstream direction,
wherein the biasing force is imparted to the clapper assembly via the cam arm and roller, so that the clapper assembly is urged to obstruct the flow path.

16. The check valve of claim 15, wherein the cam arm defines a path configured to receive at least a portion of the roller therein.

17. The check valve of claim 15, wherein the second extension comprises a shaft extending in a direction perpendicular to the longitudinal axis, and
wherein the cam arm is rotatable about the shaft.

18. The check valve of claim 17, wherein the torsion spring extends about at least a portion of the shaft.

19. The check valve of claim 17, wherein the roller and the shaft are disposed on the same side of the longitudinal axis.

20. The check valve of claim 15, wherein the first extension extends from the seal retainer.

* * * * *